UNITED STATES PATENT OFFICE.

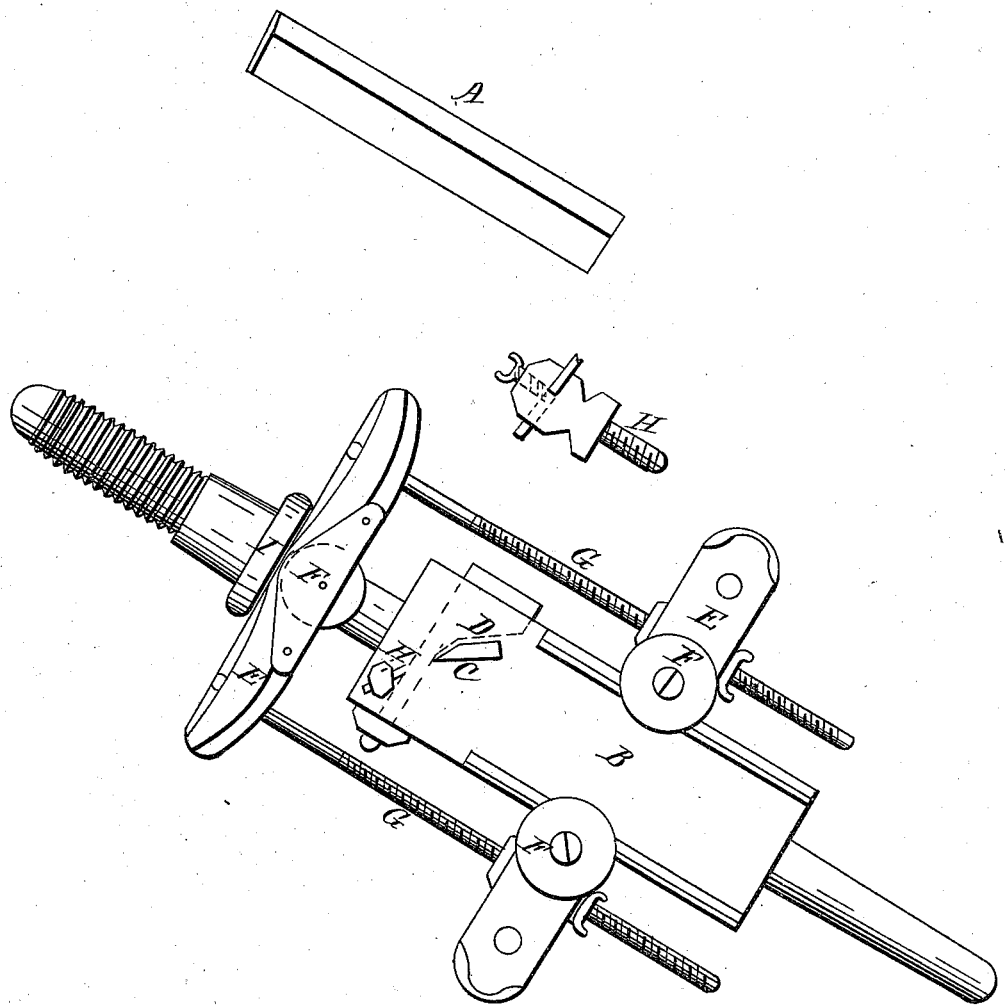

H. C. GARVIN AND J. H. KING, OF HAGERSTOWN, MARYLAND.

TOOL FOR BORING HUBS.

Specification of Letters Patent No. 12,677, dated April 10, 1855.

*To all whom it may concern:*

Be it known that we, H. C. GARVIN and J. H. KING, of Hagerstown, in the county of Washington, State of Maryland, have invented a new and useful Apparatus for Boring Out Hubs for Wagons and Carriages for the Reception of Boxes, Both Narrow and Through Boxes; and we do hereby declare that the following is a full, clear, and exact description of the construction and operation of the same, reference being had to the annexed drawing, making a part of this specification.

Construction: The knife is 7 inches long, ⅞ of an inch wide, with a back 5/16 of an inch thick, with a regular bevel commencing ¼ of an inch from the back, with a lip on the lower end to cut off, the cut, at the bottom of the shaving made by the knife. The slide (wood) is 24 inches long, divided as follows: The end that has the screw cut upon, is 9 inches long, 1¾ inches in diameter, the flat part is 2½ inches long, 3 inches wide, 2 inches thick where the knife and bolt mortises pass through, then 1½ inches thick for 8 inches, with a recess of ½ inch to give strength to the back of the rear cross head. Upon the face side, there is a groove on each corner to admit of a flange left in the mortise in the rear cross head, and to the left side, there is a hand hold of 4½ inches long, turned to operate the apparatus with; the mortise for the knife is put square through the side upon an angle of 40 degrees, upon the face side, observing the center line, reverse to this mortise is the mortise for the bolt, that holds the knife. The front cross head (wood) is 10 inches long 1½ inches thick, 2¾ inches wide made of an elliptic form, from the center, edgewise, and oval on the back part where the nut works against, which has a hole 1 7/16 inches in diameter, for the screw part of the slide to pass through. Upon this cross head is fastened, a friction roller, which has a flange ⅝ of an inch from the slide. The rear cross head (wood) is 15 inches long 2½ by 2 inches, has a mortise that is open, with projections for to work in the grooves in the slide. Upon this cross head are two friction rollers of cast iron, with flanges on the upper side, which are fastened with bolts, passing through the said cross head. These rollers may be removed to the outer ends of the cross heads to admit of the largest size wagon hubs. There are two rods (iron) for adjusting the apparatus to the hub, are each 13 inches long, with a head upon one end of each rod, with a thread cut within 4 inches of the head, with two taps upon each rod, these rods pass through each cross head, 2½ inches from the slide in which the knife is fastened, with a tap upon each side of the cross head, with the two friction rollers fastened upon.

The bolt to fasten the knife, has an angle upon the edge about 40 degrees, while the back of the bolt is straight, with a thread cut upon the one end, with a tap upon it to fasten the knife. The wooden nut upon the end of the slide where the feed is given, is 2¼ inches long, the end upon which the flange is, is 2½ inches in diameter, the flange is ½ inch thick, leaving 2 inches for a hand hold to feed up the knife for operation. The stay upon the top is made of iron, to adjust the knife to any angle that may be required, using an iron wedge on the back of the knife, on the face or front side of the apparatus, to cut hollow for through boxes, this wedge is taken out when straight boxes are to be let in.

Operation: To apply the apparatus you will first bore 1¼ inch hole through the hub, then separate cross heads E E by turning back the taps upon the rods G, G, on the outside of the rear cross head E and turning the taps on the inside toward the front cross head E, and move the knife A to the center of the hub, that you can adjust the apparatus to suit the out side of the hub, by bringing the cross heads E E together and tightening them up by the taps upon the out side of the cross head, so as to cause the flanges to form a groove around the outside of the hub, by turning it around the hub some several times before feeding up the knife A, and after the flanges have formed a groove, you will bring up the taps upon the inside of the rear cross head, so as to form a jamb, then with the nut I you will feed the knife toward the outside of the hub, revolving the apparatus at the same time until you have the size you desire. Changing the apparatus from one end to the other, cutting from each end of the hub, to cut through boxes you will throw the knife according to the angle desired or to suit the swell of the box on the outside, adjusting the stay upon the top of the slide, and putting the wedge at the back of the knife to keep the knife in the angle you may set it to.

References: A, the knife for boring out hubs; B, the slide in which the knife is fastened; C, the mortise, for the reception of the knife A; D, the bolt, that fastens the A, while in operation, to be firmly secured; E E, cross heads, through which the slide B passes; F F F, the friction rollers or travelers, fastened upon the cross heads E E, with flanges to form a groove around the hub before the apparatus is put to work so that the knife A, in performing its work, cannot throw off the apparatus; G, G, the rods and taps, that regulate and fasten the apparatus to the hub, and keep it secure to its boring, while the apparatus is at work; H H, a stay on the top of the apparatus, to keep the knife A, firm to its bearing, during the operation of boring; I, a wood nut that feeds the knife A while in operation.

What we claim as our invention and desire to secure by Letters Patent is—

The apparatus for boring wagon and carriage hubs for reception of boxes, (narrow and through boxes) as herein described, using for that purpose the aforesaid apparatus or any other substantially the same.

HENRY C. GARVIN.
JOHN H. KING.

Witnesses:
JOHN FRIES,
WM. H. HANDEY.